_(12)_ United States Patent
Song

(10) Patent No.: US 9,958,859 B2
(45) Date of Patent: May 1, 2018

(54) PROFIT MILLING

(71) Applicant: D.P. TECHNOLOGY CORP., Camarillo, CA (US)

(72) Inventor: Jianping Song, Carmarillo, CA (US)

(73) Assignee: D.P. TECHNOLOGY CORP., Camarillo, CA (US)

( * ) Notice: Subject to any disclaimer, the term of this patent is extended or adjusted under 35 U.S.C. 154(b) by 501 days.

(21) Appl. No.: 14/553,791

(22) Filed: Nov. 25, 2014

(65) Prior Publication Data

US 2015/0205294 A1 Jul. 23, 2015

Related U.S. Application Data

(63) Continuation of application No. PCT/US2013/043364, filed on May 30, 2013.

(60) Provisional application No. 61/654,465, filed on Jun. 1, 2012.

(51) Int. Cl.
*G05B 19/4099* (2006.01)
*G05B 19/4097* (2006.01)
*G05B 19/4093* (2006.01)

(52) U.S. Cl.
CPC ..... *G05B 19/4099* (2013.01); *G05B 19/4097* (2013.01); *G05B 19/40937* (2013.01); *G05B 2219/34105* (2013.01); *G05B 2219/34106* (2013.01); *G05B 2219/35114* (2013.01); *G05B 2219/35176* (2013.01); *G05B 2219/35184* (2013.01); *G05B 2219/40121* (2013.01); *G05B 2219/49224* (2013.01); *Y02P 90/265* (2015.11)

(58) Field of Classification Search
CPC .......... G05B 19/4099; G05B 19/40937; G05B 19/4097; G05B 2219/34106; G05B 2219/34105; G05B 2219/49224; G05B 2219/35176; G05B 2219/35184; G05B 2219/40121; G05B 2219/35114; Y02P 90/265

See application file for complete search history.

(56) References Cited

U.S. PATENT DOCUMENTS 3,958,471 A 5/1976 Muller
5,526,272 A 6/1996 Kondo et al.
6,363,298 B1 3/2002 Shin et al.
(Continued)

FOREIGN PATENT DOCUMENTS

CN 1599654 A 3/2005
CN 101428355 A 5/2009
(Continued)

OTHER PUBLICATIONS

International Search Report for Serial No. PCT/US2013/043364 dated Nov. 1, 2013.
(Continued)

*Primary Examiner* — Nathan L Laughlin
(74) *Attorney, Agent, or Firm* — Brooks Acordia IP Law, PC; Pejman Yedidsion

(57) ABSTRACT

Methods and devices for computer-assisted milling of a pocket region of a workpiece by computing a blend arc radius, where the blend arc radius is based on a maximal variation of a Tool Engagement Angle (TEA), and smoothing at least one offset, where the smoothing is based on the computed blend arc radius and/or a prior computed blend arc radius with a stepover.

10 Claims, 15 Drawing Sheets

(56) References Cited

U.S. PATENT DOCUMENTS

| | | |
|---|---|---|
| 6,447,223 B1 | 9/2002 | Farah et al. |
| 6,591,158 B1 | 7/2003 | Bieterman et al. |
| 6,745,100 B1 | 6/2004 | Lermuzeaux |
| 7,451,013 B2 | 11/2008 | Coleman et al. |
| 2005/0246052 A1* | 11/2005 | Coleman ............ G05B 19/40937 700/188 |
| 2007/0016325 A1 | 1/2007 | Esterling |
| 2008/0269943 A1 | 10/2008 | Diehl et al. |
| 2009/0204253 A1 | 8/2009 | Bandini et al. |
| 2010/0087949 A1* | 4/2010 | Coleman ............ G05B 19/40937 700/189 |
| 2011/0178629 A1 | 7/2011 | Diehl et al. |
| 2012/0221140 A1* | 8/2012 | Berman ............ G05B 19/4093 700/187 |
| 2013/0030562 A1 | 1/2013 | Sherbrooke et al. |
| 2014/0297021 A1* | 10/2014 | Aggarwal ......... G05B 19/40937 700/160 |

FOREIGN PATENT DOCUMENTS

| | | |
|---|---|---|
| CN | 102445922 B | 3/2016 |
| EP | 0996045 A2 | 4/2000 |
| EP | 1 356 866 B1 | 3/2003 |
| EP | 1 638 772 B1 | 6/2004 |
| JP | H0825178 | 1/1996 |
| JP | 10171514 | 6/1998 |
| JP | 2002132315 | 5/2002 |
| JP | 2006127213 | 5/2006 |
| JP | 2006334684 A | 12/2006 |

OTHER PUBLICATIONS

Kramer, Thomas R., "Pocket Milling with Tool Engagement Detection," Apr. 1, 199, pp. cover page and 1-16.

Ibaraki,Yamaji, Kakino,"Tool Path Planning Using Trochoid Cycles for Hardened Steel in Die and Mold Manufacturing," (1st Report), Advances in Agile Manufacturing—ICAM 2003.

Yamaji,Ibaraki, Kakino,"Tool Path Planning Using Trochoid Cycles for Hardened Steel in Die and Mold Manufacturing," (2nd Report), Advances in Agile Manufacturing—ICAM 2003.

Held, Martin,"VRONI:An engineering approach to the reliable and efficient computation of Voronoi diagrams of points and line segnnents,"Computational Geometry 18,2001,pp. 95-123.

English Translation of Japanese Office action for Application No. 2015-515189 dispatched Mar. 14, 2017.

* cited by examiner

PROFIT MILLING

CROSS-REFERENCE TO RELATED APPLICATIONS

This application is a continuation of International Patent Application No. PCT/US13/043364 filed May 30, 2013, which claims priority to and the benefit of Provisional Patent Application No. 61/654,465 filed Jun. 1, 2012, the contents of both are hereby incorporated by reference herein for all purposes.

TECHNICAL FIELD

The invention, in its several embodiments, relates generally to tool path trajectory planning for computer-aided manufacturing (CAM) and more particularly to the computer-assisted milling of pocket-type shapes using machine tools.

BACKGROUND

Manufacturing companies use computer-aided manufacturing (CAM) software systems to program computer numerical control (CNC) machine tools for the production of discrete parts such as molds, dies, tools, prototypes, aerospace components, and more. The variety of machined shapes is potentially infinite. Shapes are usually classified according to convenient mathematical structures, often involving the use of sub-fields of mathematics (topology).

SUMMARY

Exemplary method embodiments may include a method of milling a pocket region of workpiece, the method comprising: computing a blend arc radius, where the blend arc radius is based on a maximal variation of a Tool Engagement Angle (TEA); and smoothing at least one offset, where the smoothing is based on at least one of: the computed blend arc radius and a prior computed blend arc radius with a stepover. In additional exemplary method embodiments, the Material Removal Rate (MRR) may not exceed a specified value during milling and the feedrate change and TEA change may be within an acceptable range. In additional exemplary method embodiments, smoothing at least one offset may further comprise calculating a first smoothing phase, where the first smoothing phase may comprises at least one of: breaking an offset and replacing a partial offset with blends where the tool engagement has significant changes. In additional exemplary method embodiments, smoothing at least one offset may further comprise calculating a second smoothing phase, where the second smoothing phase comprises at least one of: finding at least one narrow area formed by at least two or more blend arcs and partial offsets between the blend arcs; removing at least one narrow area formed by at least two or more blend arcs and partial offsets between the blend arcs; and generating at least one narrow area formed by at least two or more blend arcs and partial offsets between the blend arcs. In additional exemplary method embodiments, trochoidal movements may be generated to replace the partial offsets. In additional exemplary method embodiments, offsets and generated trochoidal movements may be connected in the at least one narrow area, where the connecting may be in order from a center of the pocket region to a boundary of the pocket region. In additional exemplary method embodiments, auxiliary movements may be generated, where the auxiliary movements may comprise at least one of: entry movements and exit movements.

Exemplary device embodiments may comprise a device comprising: a planning module, where the planning module may comprise a processing module; a numerical code generator, where the numerical code generator may be configured to receive instructions from the planning module; and a machining tool, where the machining tool may be configured to receive instructions from the numerical code generator. In additional exemplary device embodiments, the planning module may further comprise at least one database, where the at least one database may be configured to contain information on at least one of: a feature defining a pocket of a workpiece to be machined; at least one technological option; and at least one auxiliary movement. In additional exemplary device embodiments, the device may further comprise a user interface, where the user interface may be configured to select, by a user, an object in the at least one database.

Additional exemplary device embodiments may include a device comprising a processing module having addressable memory, where the processing module may be configured to: select a pocket feature of a workpiece to be machined; create at least one contour-parallel offset, where the at least one contour-parallel offset may be created from at least one of: at least one boundary of the pocket feature and an offset based on a Voronoi Diagram (VD); compute a preferred smoothing radius (PSR), wherein the PSR is the radius of the Preferred Smooth Arc (PSA); identify any narrow areas in the at least one contour-parallel offset; replace the identified narrow areas with a blend arc; determine if any of the offsets can be smoothed, wherein the processing module ends a process if no offsets can be smoothed and the process continues if at least one offset can be smoothed; and connect each offset with at least one linking movement. In additional exemplary device embodiments, the processing module may be further configured to: receive an input, by a user, of at least one technological option. In additional exemplary device embodiments, determining if any of the offsets can be smoothed may be by determining if any of the offsets are large enough by comparing it to the PSA. In additional exemplary device embodiments, the processing module may be further configured to: store any identified narrow areas in a map of blend arcs and narrow areas. In additional exemplary device embodiments, the processing module may be further configured to create a trochoidal movement, where the created trochoidal movement may be in the stored identified narrow areas. In additional exemplary device embodiments, the connected each offset may start with an entry movement and may connect each adjacent offset until all offsets are traversed. In additional exemplary device embodiments, the processing module may be further configured to generate a numerical code. In additional exemplary device embodiments, the processing module may be further configured to generate auxiliary movements. In additional exemplary device embodiments, the generated auxiliary movements may be at least one of: entry movements and exit movements.

BRIEF DESCRIPTION OF DRAWINGS

Embodiments are illustrated by way of example and not limitation in the figures of the accompanying drawings, and in which.

DETAILED DESCRIPTION

Figure 1:
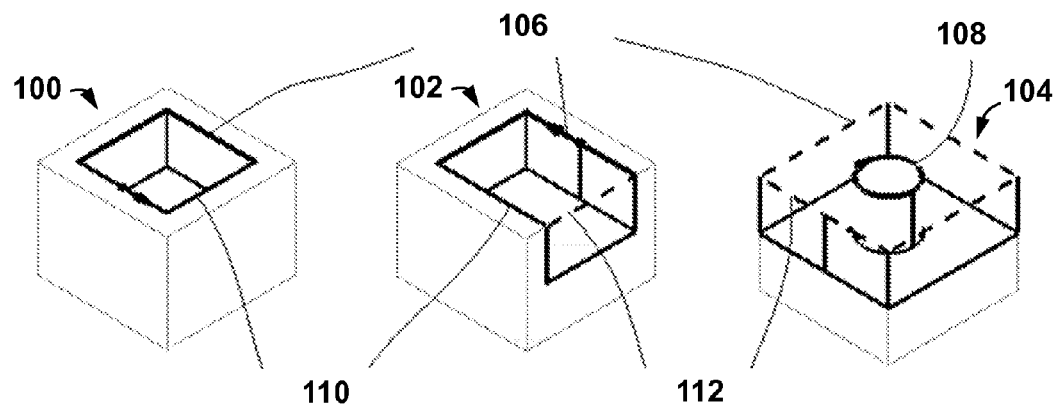
FIG. 1 depicts a perspective view of three kinds of pockets.

FIG. 1 depicts a perspective view of three kinds of pockets: a closed pocket 100, a partially open pocket 102, and a fully open pocket 104. A "pocket" shape is a simple geometric concept that is defined by specifying a set of planar, geometrically closed, and non-self-intersecting profiles. The biggest profile in a set of profiles is called the pocket outer border 106, and may contain additional smaller profiles. These smaller profiles may be located inside the pocket outer border 106, and are called island borders 108 or islands of the pocket. The entire region defined by the pocket outer border 106, and any island borders 108, contains material that may require removal. The outer border 106 may comprise one or more closed edge(s) 110 and/or open edge(s) 112. These pocket shapes exist widely in various parts, dies, and molds.

The contour-parallel method is an algorithm used to generate tool paths for pocket milling. For example, an exemplary procedure to create a pocket tool path in a CAM system may involve several steps. First, the procedure may select a set of geometrically closed profiles, a pocket feature, or a 3-dimensional (3D) feature that defines the outer boundary and any inner islands of the area to machine. Second, the procedure may describe how the cutting tool will move into, and move out of, the material by selecting entry and exit modes and related technology parameters, or geometrical elements. Third, the procedure may describe how the cutting tool will move inside the pocket by specifying a set of technology parameters that may include the size and type of the cutting tool; the feedrate; the spindle speed; the depth, i.e., cutting length in tool axial direction; the stepover, i.e., cutting length in tool radial direction; and/or tool engagement angle.

After all geometry and technology parameters are set, the first offset of the tool path may be calculated by considering the shape of the cutting tool, the geometrical shape of the pocket, and stock allowance, i.e., extra material that may be removed by later machining operations. If the geometrical shape of the pocket is a 3D feature, the first offset may not be a simple direct offset from the geometric shape because the distance from this "offset" to the geometric shape may be different at various points of this offset. The first offset typically defines the area the tool may move freely inside the part without gouging the part. Consecutive constant offsets from the first, or previous, offset may be calculated by applying a stepover, or some value derived from a stepover. The offset direction, inward or outward, may depend on which algorithm is used.

There are two methods for calculating offsets. The first method is to calculate the offset directly from the boundary geometry profile, find the intersection points between the geometry elements, trim the elements at intersection points, and then connect each element by geometry and/or topology relationship. The second method uses the Voronoi Diagram-based method to create a circular offset. In this method, the medial-axis transform of all profiles may be calculated first. The medial axes may simply be the phase of finding intersection points between elements, and trimming elements. Based on the medial-axis transform, the maximal inscribed circle of a pocket may be easily found, which gives the choice for inward or outward offset direction. The offset is finished when the offsets collapse on themselves, e.g., the inward offset of a closed pocket, or meet some critical conditions, e.g., the offset falls outside of the machining area.

Figure 2:
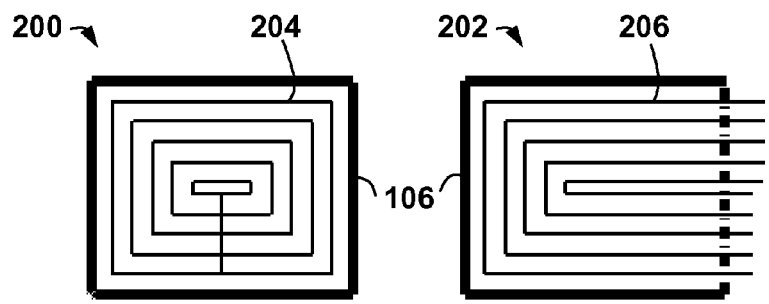
FIG. 2 depicts a closed pocket, a partially open pocket, and their respective offsets.

FIG. 2 depicts various pockets and their respective offsets. The closed pocket 200 comprises an outer border 106 on all sides (See FIG. 1, 100). The partially open pocket 202 comprises an outer border on three sides with an open fourth side (See FIG. 1, 102). The offset 204 of the closed pocket 200 and the offset 206 of the partially open pocket 202 show the path of the cutting tool.

Figure 3:
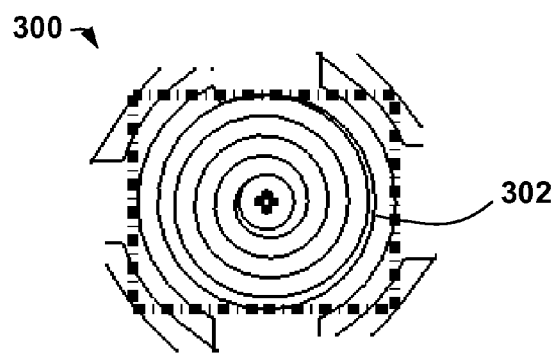
FIG. 3 depicts an open pocket and its respective offset.

FIG. 3 depicts an open pocket 300 and its respective offset 302. The offsets generated in the steps above define the tool path. The center of the cutting tool will follow the tool path to remove material inside the pocket. The tool starts from the offset that is farthest from the closed boundary or closed edges of the boundary, followed by the closest adjacent offset, and followed after that by the next closest adjacent offset until all offsets have been traversed. A connecting move is required between two adjacent offsets that may be a set of cutting movements or non-cutting movements, as illustrated in FIG. 5.

Figure 4:
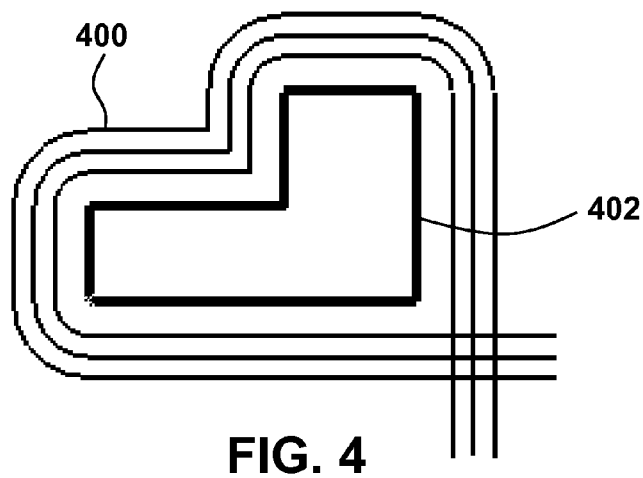
FIG. 4 depicts a contour-parallel offset for a contour profile.

FIG. 4 depicts a contour-parallel offset 400 for a contour profile 402. The tool path for contour profiles also uses the contour-parallel method to calculate the offsets. A contour profile is a boundary that defines a machining border, which may be geometrically open or closed. When the amount of material to remove is constant on one machining side of the profile, it may be simpler to generate the tool path by just selecting a contour profile, as illustrated FIG. 4.

The contour-parallel method focuses on the generation of a tool path that may geometrically remove the required volume. It does not take into consideration factors that affect cutting forces. As a result, it may inevitably introduce variations in the contact area between the cutting tool and the material, i.e., tool engagement, depending on the tool path geometry. If the entirety of the tool path has a constant feedrate, this may cause a variation in cutting forces, tool chatter, and/or vibration during machining. The variations in cutting forces may also cause variations in the tool deflection, which may manifest as dimensional and surface errors on the machined parts.

Figure 5:
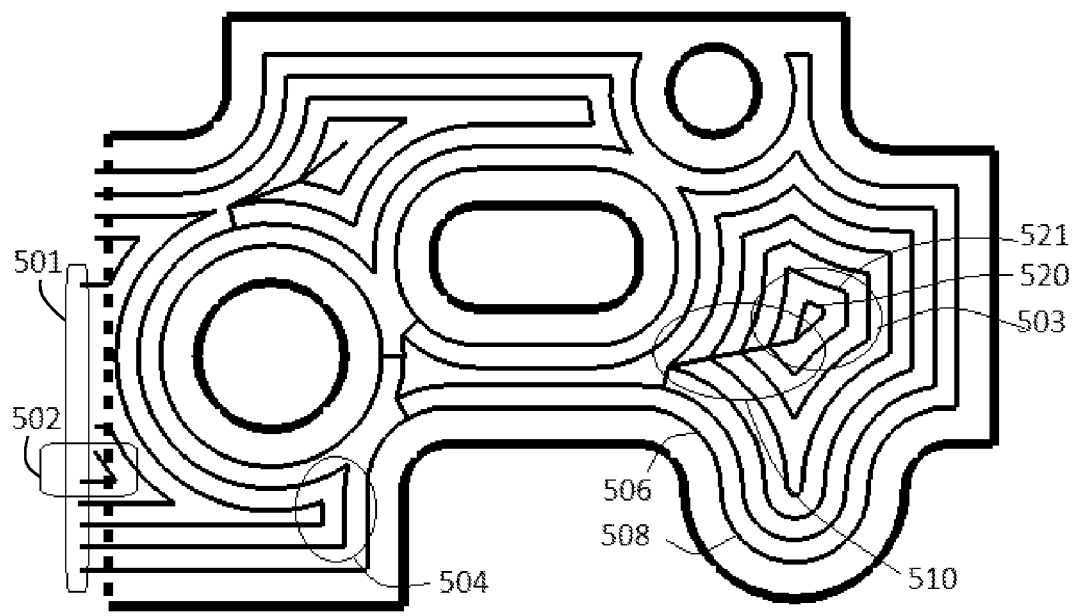
FIG. 5 depicts a tool path with areas of tool engagement change.

FIG. 5 depicts a tool path with areas of tool engagement change. Changes in tool engagement may occur when curvature changes or the cutting direction changes at points along the tool path. The typical tool engagement change for a contour-parallel offset tool path occurs in five areas. The first area is in the entry area 501 where the tool descends into the material. The entry area 501 may usually be located at an innermost point of a closed pocket (See FIG. 1, 100) or on the non-material side of the open edge(s) of an open pocket (See FIG. 1, 102). The second area for tool engagement change is in center areas 502,503. The center area 502 surrounds the entry area 501 or the center 503 of a local sub-region. The third area for a tool engagement change is in a sharp corner area 504. A sharp corner area 504 is an area where connected adjacent elements form a concave area if viewed from a side view of the machined area. The fourth area for tool engagement change is in circular arc areas 506,508. The circular arc areas 506,508 are areas where the tool moves along either a concave circular arc 506 or a convex circular arc 508. The fifth area for tool engagement change is in an offset connection area 510. The offset connection area 510 is an area that connects two adjacent offsets.

The cutting force on the tool may be determined by material properties, tool geometry, spindle speed, and material removal rate (MRR). MRR, at a point along a tool path, may be defined as:

$$MRR = dsf \text{ where:} \tag{1}$$

d=depth (length in tool axial direction);
s=actual stepover (length in tool radial direction); and
f=feedrate.

The material properties, tool geometry, and spindle speed remain the same during the cutting process. Therefore, the MRR may be the only variable factor that affects the cutting force.

The depth in the definition of MRR above remains constant in a 2D pocketing tool path. Therefore, a constant MRR may be maintained by adjusting the feedrate when the actual stepover changes. However, kinematic characteristics of the machine tool may limit whether it is possible to increase or decrease the feedrate to a specified value in a short time period if the variation in feedrate is large enough to exceed machine limits. Therefore, it is not practical to maintain an actual MRR that does not exceed the specified value by simply adjusting the feedrate. The actual stepover change may need to be controlled in order to limit the feedrate change. Controlling the change in actual stepover is identical to controlling the change in the tool engagement angle (TEA) because actual stepover is determined by the TEA.

One embodiment of the present invention includes an algorithm that generates a milling tool path in a pocket region of a workpiece that: a) maintains the actual MRR at each point of the tool path, i.e., where the center of the tool may traverse during the cutting process, close to, but without exceeding, the referenced MRR assuming the tool moves along a straight line with a specified stepover; and b) keeps the feedrate and TEA change within acceptable ranges.

Based on conventional contour-parallel offsets, the present algorithm computes a blend arc radius based on a maximal variation of TEA, then smooths all offsets in two phases by using this blend arc radius or a previous inner blend arc radius plus the stepover, respectively. The first smoothing phase breaks the offsets and replaces partial offsets with blends where the tool engagement has significant changes. The second smoothing phase finds and removes or generates narrow areas formed by at least two or more blend arcs and partial offsets between blend arcs. In each narrow area that is kept, trochoidal movements are generated to replace the partial offsets. Offsets and their trochoidal movements in narrow areas are connected in order from the center of pocket to the boundaries to form a tool path. Entry and exit movements may then be attached to the beginning of the tool path and the end of the tool path to complete the tool movements.

Figure 6:
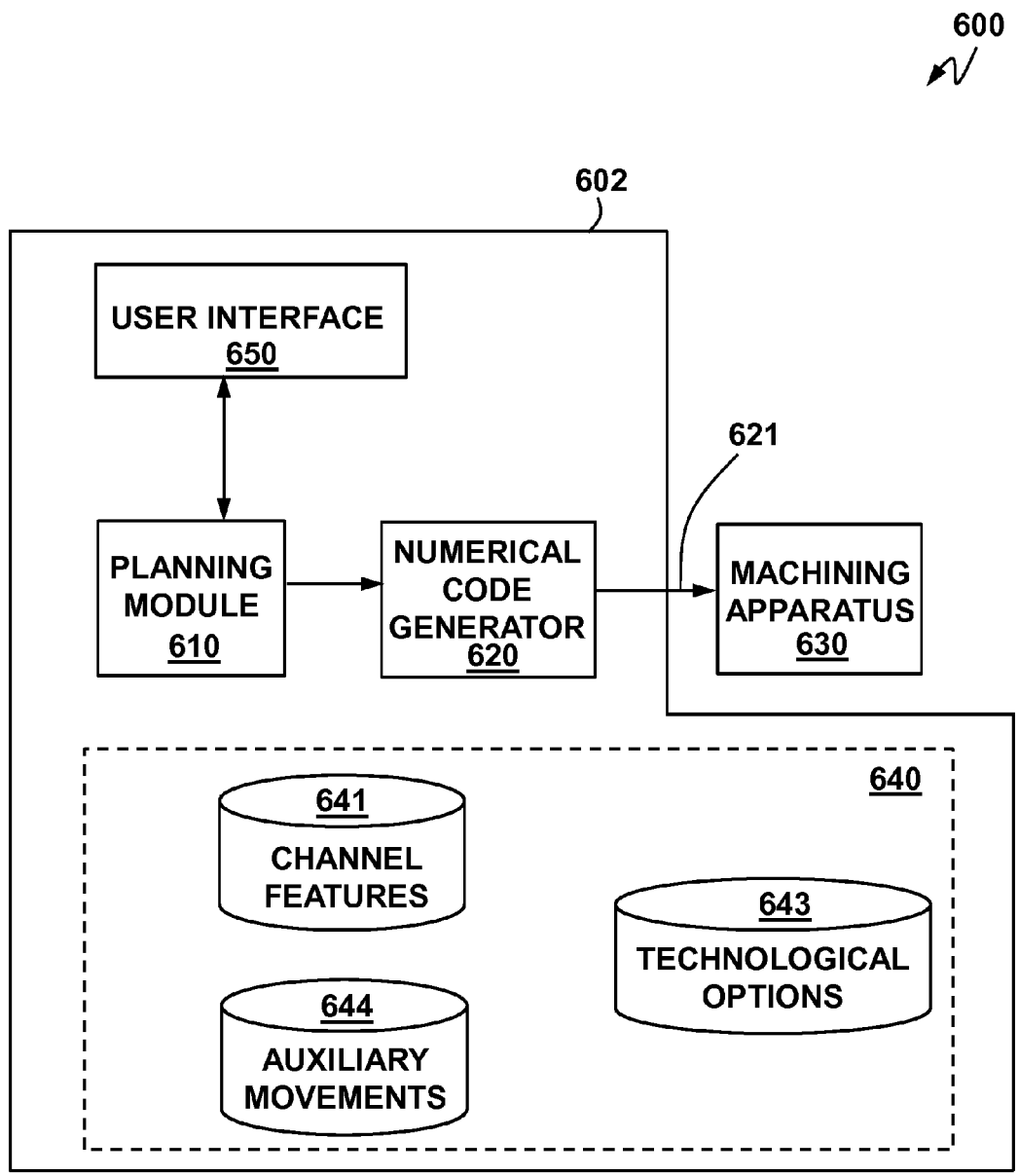
FIG. 6 depicts, in a functional block diagram, a computer-aided manufacturing system.

The invention in its several embodiments includes a computer-aided manufacturing system 600, as illustrated in the functional block diagram of FIG. 6. The system 600 may comprise a machining apparatus 630 and a device 602. The device may comprise a planning module 610 and a numerical code generator 620. The planning module 610 may comprise a processing module. The numerical code generator 620 may be a separate processing module or it may be embodied as computer-executed instructions that are executed by the processing module of the planning module 610. Numerically controlled machines may be automatically operated by commands received by their processing units. The machining apparatus 630 may further comprise a machining tool or a cutting tool and may reorient such machining tool or cutting tool relative to a workpiece according to instructions provided by the numerical code generator 620. The numerical code generator may be responsive to the output of the planning module 610.

The planning module 610 may have access to one or more databases 640. These databases 640 may comprise computer-based models of channel features 641, technological options 643, and auxiliary movements 644. Channel features 641 may include models defining the pocket of the workpiece to be machined, where these features may be a set of profiles with properties like open edges, closed edges, taper angles, etc. Technological options 643 may include models expressing the relative position between the cutting tool of the machining apparatus 630 and the workpiece, along with machining strategy. Auxiliary movements 644 may include models including instructions for approaching the workpiece, instructions for departing the workpiece, and instructions for movements connecting machining sub-areas. Via a user interface 650, a user of the system 600 may select files or objects from the databases 640 for the application, by the planning module 610, to generate the numerical code 621 for the machining apparatus 630, e.g., G-code. The machining apparatus 630 may then receive the numerical code 621 and execute the coded instructions to drive the machine tool.

Figure 7:
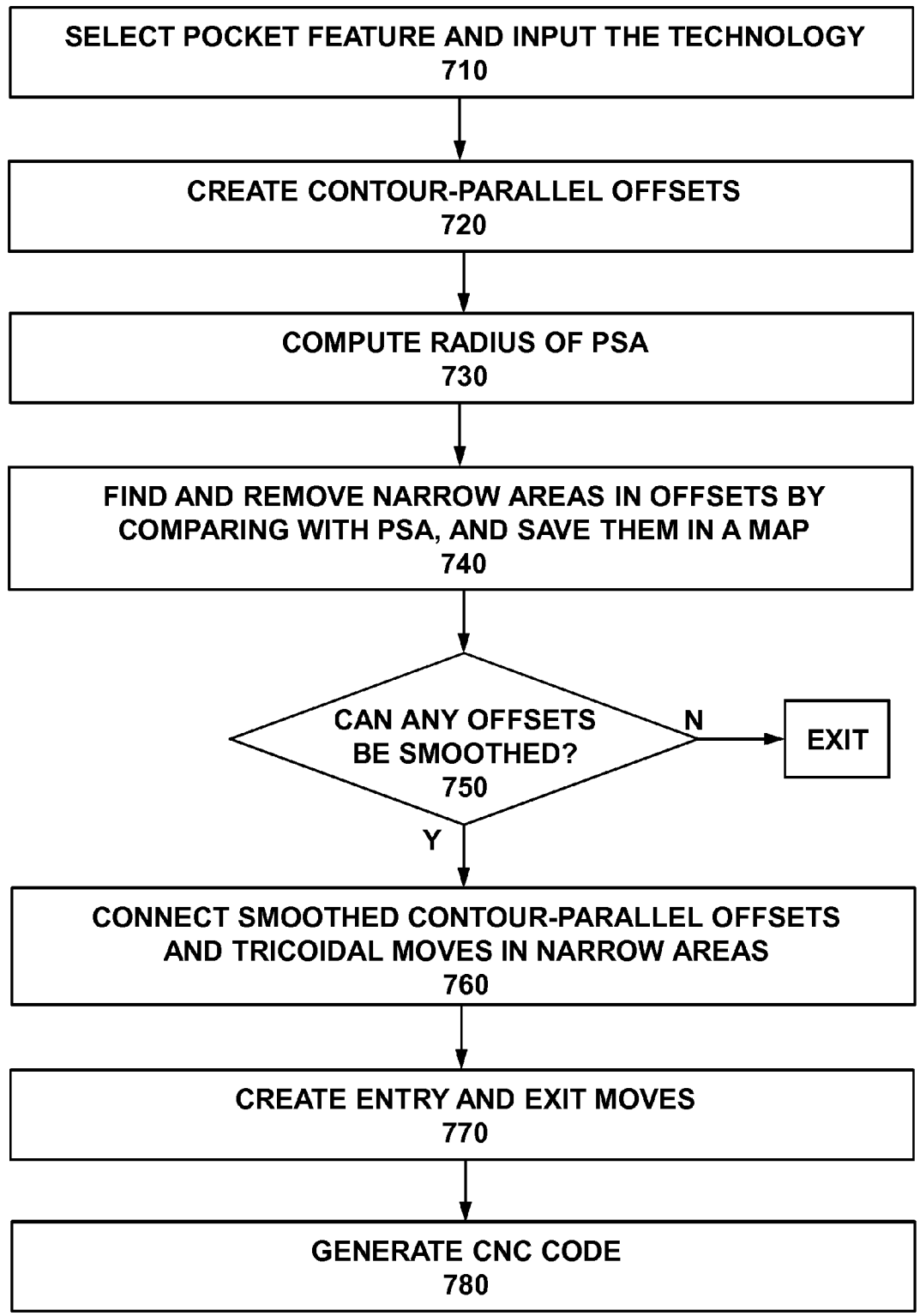
FIG. 7 depicts, in a top-level flowchart, an exemplary method of pocket machining.
Figure 8:
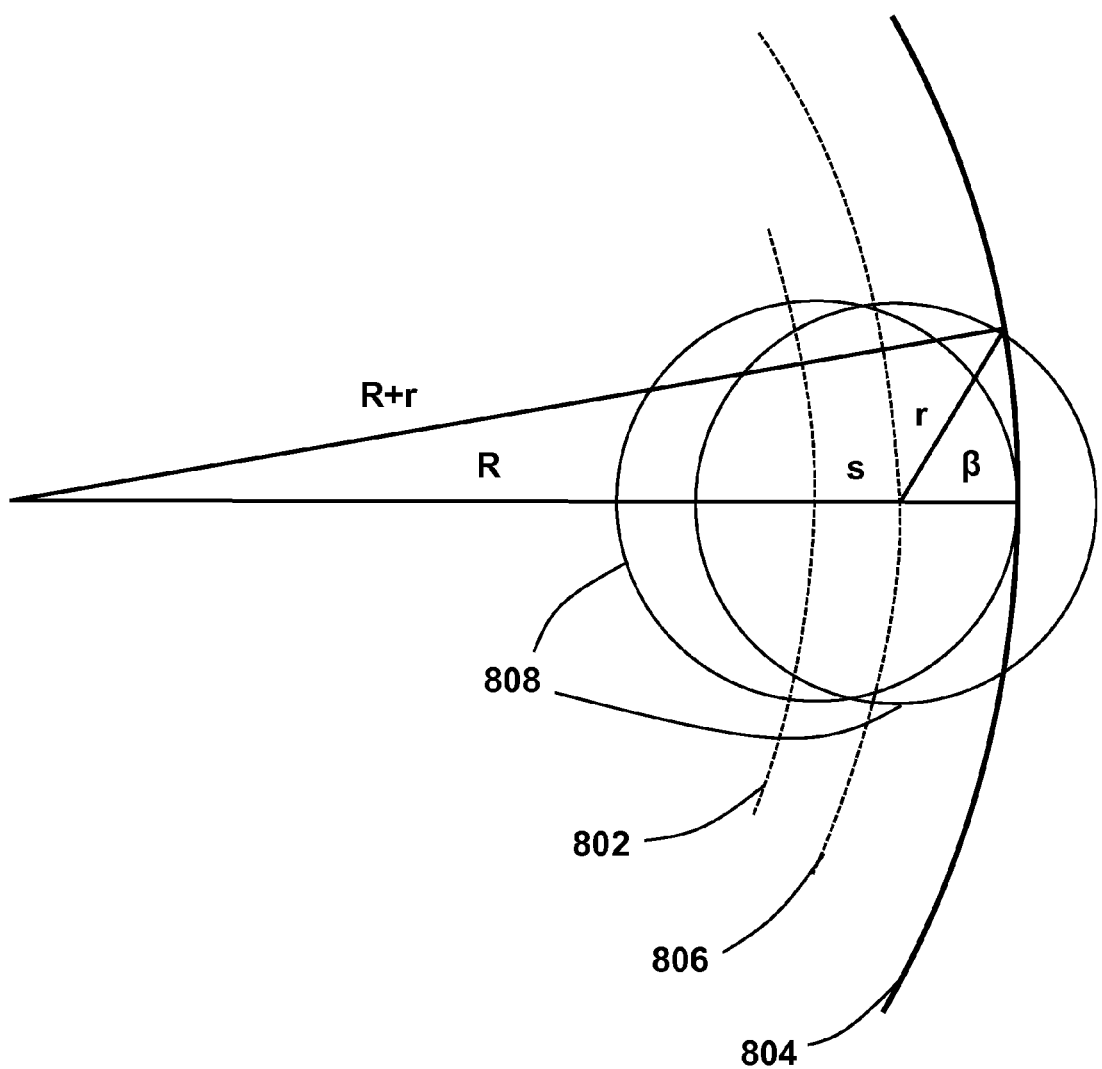
FIG. 8 depicts a radius of a preferred smooth arc.

The invention in its several embodiments includes an exemplary method of pocket machining where a Profit Milling machining cycle may include a planning or programming process comprising seven steps, as illustrated in a top-level flowchart in FIG. 7, which may then be followed by the CNC coding. The first exemplary planning step of Profit Milling may comprise selecting the pocket feature of the workpiece to be machined and input the technology (step 710). The second step may comprise creating contour-parallel offsets by making an offset directly from the boundaries of the pocket or making Voronoi Diagram (VD) and then making the offset based on the VD (step 720). The third step may comprise computing the Preferred Smoothing Radius (PSR), as illustrated in FIG. 8, which is the radius of the Preferred Smooth Arc (PSA) (step 730). The PSR is the smallest blend arc radius that is used to round all offsets. The PSAs are used to replace the partial offsets in narrow areas of the offsets. The TEA of the PSAs outer concentric arc in an adjacent outer offset is guaranteed to be in a specified range by the PSR. The fourth step may comprise walking through each offset to identify the narrow areas and using a blend arc to replace the narrow areas on the offset (step 740). This narrow area may then be stored in a map of blend arcs and narrow areas for later creating trochoidal movements. The fifth step may comprise terminating the process if none of the offsets is large enough by comparing it to the PSA (step 750). The process continues if any of the offsets can be smoothed. The sixth step may comprise connecting each element of the farthest offset with link movements between adjacent offsets followed by adjacent outer offsets until all offsets are traversed (step 760). Trochoidal movements may be created in each narrow area and inserted after a blend arc. The seventh step may comprise generating entry movements and exit movements (step 770). Thereafter, the method may include the step of generating the CNC code, e.g., G-code (step 780).

First Exemplary Embodiment

The first set of movements in a complete tool path is entry movements whose purpose is to move the tool to the machining level. For an all-edges closed pocket where the tool must enter the material from above, using one of the entry strategies, e.g., entering at a pre-drilled hole, following a helical ramp down or a zigzag ramp down and an entry feedrate that is slower, the tool may smoothly move into the material. The moving range of a "ramp down" strategy for entry movements is usually bounded by a length or circular arc radius on the machining plane and a depth in the machining axis direction. A ramp angle is also specified to determine the gradient of moving down the curve. In addition, the orientation of a helical curve may be determined by a specified climb/convention cutting strategy for a helical down mode. For a partially or all-edge(s) open pocket where the tool may enter from the side, the tool may rapidly plunge down to the machining level on a non-material side of one of the open edge(s) followed by lead-in movements that make tool contact with the material on the machining level. By employing "ramp down" and "feedrate slow down" strategies, the entry movements lead the tool into the material on the machining level with acceptable tool loads.

The next tool movements are in the center area of the part to be machined. In some embodiments, the tool is fully engaged with the material in the beginning portion of the tool path before some material is removed for a conventional contour-parallel offset tool path. The present exemplary embodiment recreates a new center area and different tool movements inside the new center area. In this exemplary embodiment, the new center area is around the conventional center area, which is formed by a closed smooth profile. The TEA of tool movements inside this new center area is kept within an allowed range. The size of the new center area may be determined by a PSR that is computed from the stepover and tool radius. The new center area may be generated by smoothing the contour-parallel offset by using the PSR, which is described in the second exemplary embodiment in detail. The method for computing the PSR is described below.

In some embodiments, the corresponding movement in adjacent inner offset is also a straight line when the tool moves along a straight line in an outer offset. The relationship between stepover and TEA in this situation may be represented by:

$$s = r(1 - \cos(\alpha)) \text{ or} \quad (2)$$

$$\alpha = \cos^{-1}(1 - s/r) \text{ where:} \quad (3)$$

s=stepover or offset distance between adjacent offsets;
r=tool radius; and
α=engagement angle at a point on straight line.

Expression (3) represents a way to compute the tool engagement angle from the stepover and tool radius when the tool moves along a pair of straight lines. The tool engagement angle computed in this situation sets a base of tool engagement angle (BTEA). The stepover for generating offsets is always constant for all conventional contour-parallel offsets, and the instantaneous tool cut width or tool engagement angle is different from BTEA when the tool moves in the five kinds of areas. The instantaneous tool cut width or tool engagement angle may be computed from the tool shape, instantaneous tool location, and material boundary. The tool removes the material and forms a new material boundary for following the outer offset when the tool moves on the previous inner offset.

By limiting the maximal curvature at the previous inner offset, the maximal TEA for following the outer offset may be limited. The PSR corresponds to a maximal curvature, which may be represented as:

$$R = (ks - s^2)/(2(s-r)-k) \text{ where:} \quad (4)$$

R=PSR;
s=stepover or offset distance between adjacent offsets;
r=tool radius;
k=2r*cos(λ−β);
β=α+δ, maximal tool engagement angle;
α=BTEA or base tool engagement angle; and
δ=maximal variation of tool engagement angle.

FIG. 8 illustrates how expression (4) is deduced. Preferred smooth arc (PSA) 802 is tool movement in a previous inner offset that generates a Material Border 804. The Arc 806 is in an adjacent outer offset, which is a concentric arc of the PSA 802, and the radius difference is the stepover between two adjacent offsets. The Tool Outline 808 is a tool projection on the machining plane.

Some inner offsets may be removed if they are too small by comparison with the PSR when smoothing contour-parallel offsets. The first set of innermost offsets, generated by smoothing the offsets, form new center areas. The TEA of adjacent outer offsets that are parallel to the border of center areas may be limited. The offsets inside center areas are replaced with trochoidal movements inside the center area to avoid a large TEA when the tool moves along these inner offsets. The PSR computed here is used for identifying narrow areas in contour-parallel offsets in the second embodiment.

Second Exemplary Embodiment

This exemplary embodiment describes an algorithm to find and process narrow areas in offsets generated by the contour-parallel offset method for avoiding the TEA at each point of offsets having significant change. The algorithm smooths a group of offsets each time, in which each offset has the same offset distance to the boundaries of the pocket. The smoothing starts from the group of offsets farthest from the pocket boundaries until all offsets are traversed. Two phases of smoothing are applied for each group of offsets.

Phase I smooths the group of offsets by using the PSR as a blending radius, the same as how the PSR is computed in the first embodiment, and using the PSR to smooth the offset may limit the TEA of the following smoothed offset to an acceptable range when the tool moves along them. The smoothing here is "global" smoothing, which means that the blend arcs are generated based on the whole group of offsets, instead of the sharp corners of a single offset. For this purpose, inward offsets of all offsets in the group are generated by using the PSR as the offset distance, which are used as guiding profiles to overlook the narrow areas of offsets in the group. By alternately walking on guiding profiles and offsets in the group, the narrow areas in offsets in the group will be found and replaced by PSAs. In this smoothing phase, only the narrow areas—found when smoothing the outmost offset—are saved in a map of blend arcs and narrow areas for removing any sharp corners of the pocket at a much slower feedrate. The offsets are smoothed since their narrow areas are replaced by blend arcs. The narrow area is either in the corner of a single offset or in the connection area between two or multiple offsets.

Figure 9:
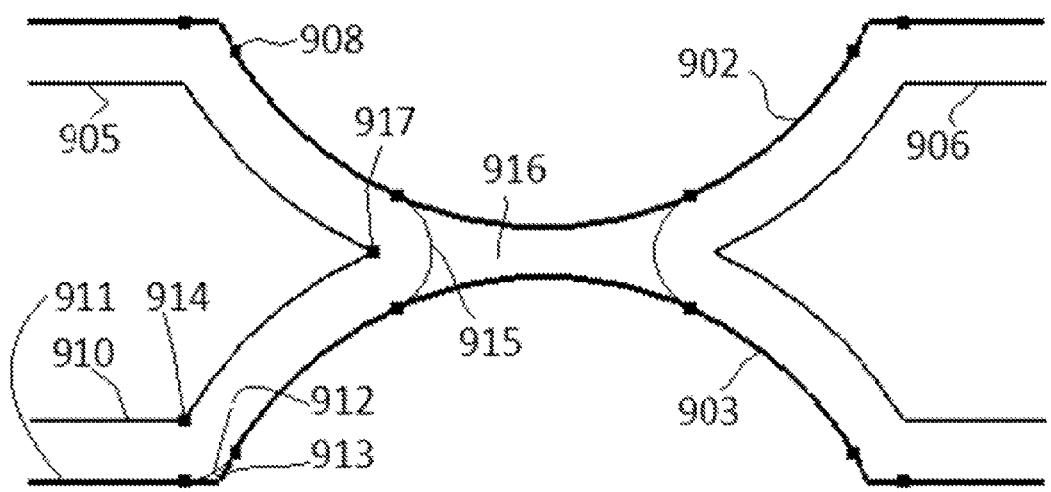
FIG. 9 depicts two offsets and their guiding profiles.

FIG. 9 illustrates two offsets 902,903 and their guiding profiles 905,906. Both the first offset 902 and a second offset 903 have the same offset distance to the boundaries of the pocket. The guiding profiles 905,906 are offset profiles of the offsets 902,903 where PSR is the offset distance. Point 908 and other points are used to break offsets in order to find a one-to-one match pair element in guiding profiles and offsets. Element 910 on guiding profile 905 is selected as the start element to smooth offsets 902,903. Element 911 on offset 903 will be kept since it matches element 910 in guiding profile 905. A PSA 912 and narrow area 913 will be generated when walking to the sharp corner 914. Another PSA 915 and narrow area 916 are created when walking to the sharp corner 917. The process is repeated until all elements on the guiding profiles are traversed.

Figure 10:
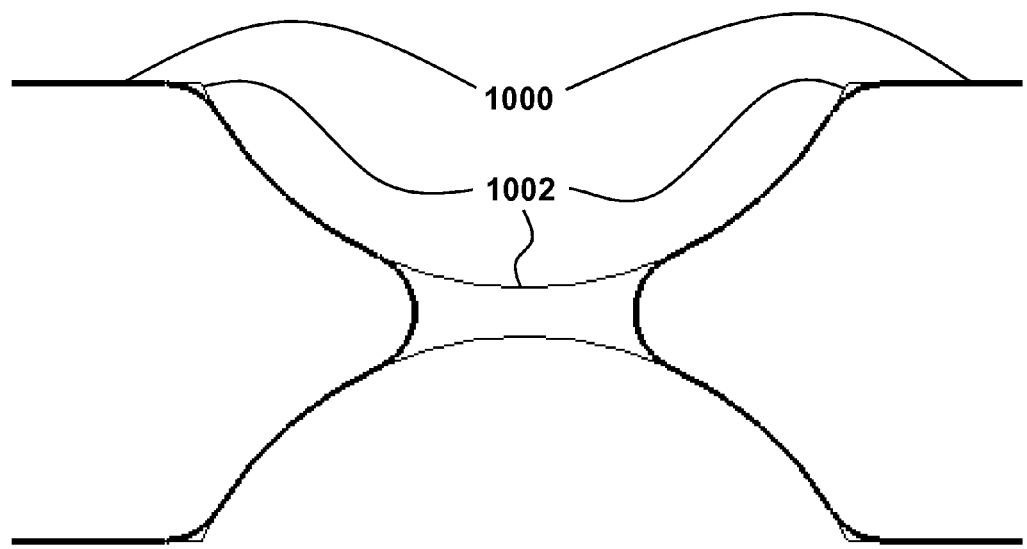
FIG. 10 depicts two smoothed offsets.

The smoothed offsets 1000 and the narrow areas 1002 are illustrated in FIG. 10. The conclusion may be made that the area surrounding this group of offsets is too small if none of the guiding profiles may be generated, i.e., the TEA when the tool moves along these offsets cannot satisfy the specified value. This group of offsets may be removed and the material left in this area may be handled by bigger outer offsets that are closer to the pocket boundaries. A pocket that may be too small may result if none of the smoothed offsets can be generated, even for the group of offsets nearest to the pocket boundaries. In this case, either the machining technology needs to be changed or a different tool path pattern needs to be used in order to generate a tool path for milling this pocket. The Minimal Smoothing Radius (MSR) is used to smooth the group of offsets nearest to the boundaries of the pocket in the first phase of smoothing. MSR is a smaller value than PSR and specified by the NC programmer. The purpose is to allow the generation of smaller narrow areas in offsets closest to the boundaries of pockets and allow more material to be removed by trochoidal movements.

Phase II smooths the offsets already smoothed in the first phase by taking the adjacent inner group of offsets smoothed by two phases as guiding profiles, and using the radius of each convex arc in the guiding profiles plus stepover as the blending radius. Two or multiple blend arcs generated in two smoothing phases and the partial offsets among these two or multiple blend arcs form a narrow area that will be saved in a map of blend arcs and narrow areas if it is valid. Some partial offsets remain in offsets if their narrow area is valid, which will be replaced by trochoidal movements generated inside the narrow area when connecting the tool path. These valid narrow areas are called trochoidal areas. Another partial offsets is replaced by a second phase blend arc if their narrow area is invalid.

There are two conditions to determine if a narrow area is valid: a) the length of the bottom segment with two end points of the second blend arc of the narrow area is large enough; and b) the ratio of "slim" of the narrow area is small enough. The "slim" ratio is defined as the height of the narrow area divided by the length of the bottom segment. The height of the narrow area may be the distance between the farthest point on the partial offset of the narrow area to the bottom segment. The long pull-back air movements for trochoidal arcs may be avoided by removing these invalid narrow areas, and therefore machining time is saved.

There are two purposes for the second phase of smoothing: a) to improve the smoothness from the first phase by replacing the blend arcs generated in the first phase of smoothing with bigger blending arcs; and b) to make narrow areas bigger by postponing the creation of narrow areas until the next group of offsets. The bigger narrow area could potentially reduce the trochoidal movements inside the narrow area because it has more space to adjust the stepover between trochoidal arcs to make it closer to the maximal allowed value. The second phase smoothing may not be done for the first group of smoothed offsets farthest from the pocket boundaries because there is no guiding profile available.

Figure 11:
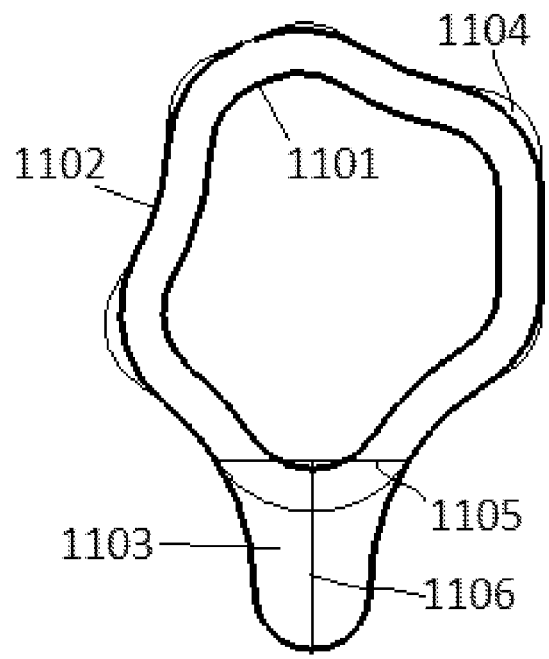
FIG. 11 depicts details of an offset smoothed by two phases.

FIG. 11 depicts details of a smoothing offset. Offset 1101 is an offset smoothed by two phases, which is in adjacent inner offsets. Offset 1102 is an outer offset smoothed by two phases. Narrow area 1103 is saved in a map and other narrow areas, such as narrow area 1104, are discarded. The bottom segment of narrow area 1103 is 1105 and the height of narrow area 1103 is 1106. The two offsets 520,521 in FIG. 5 inside the smoothed offset 1101 in FIG. 11 are removed from the offsets.

Figure 12:
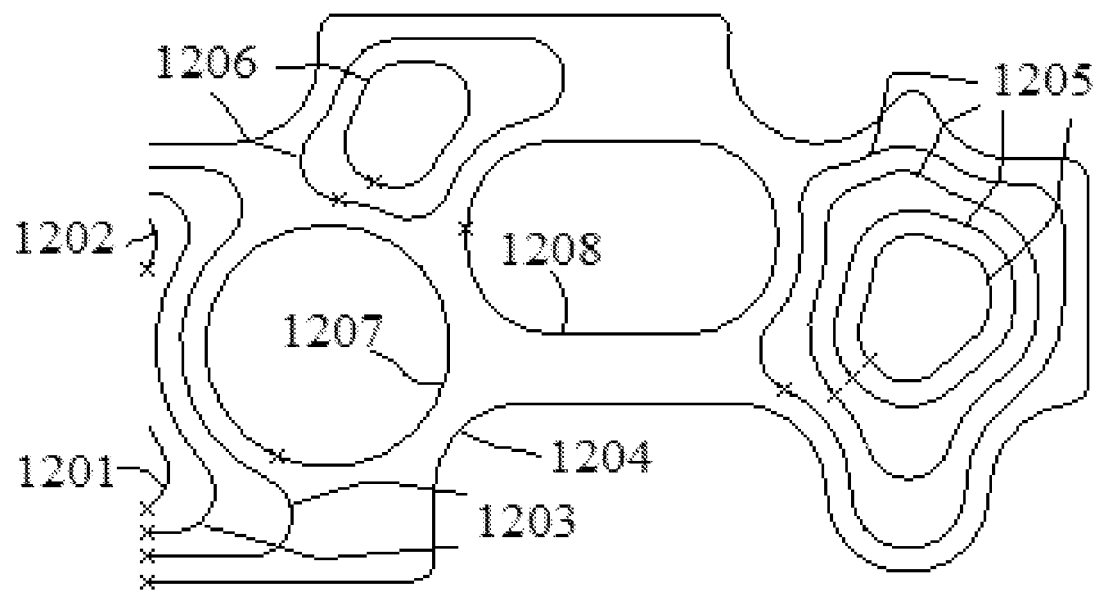
FIG. 12 illustrates smoothed offsets generated by smoothing the original offsets in FIG. 5.

FIG. 12 illustrates smoothed offsets generated by smoothing the original offsets in FIG. 5. There are four groups of open offsets 1201,1202,1203,1204 illustrated in FIG. 12. There are four groups of closed offsets 1205,1206,1207, 1208 illustrated in FIG. 12.

Figure 13:
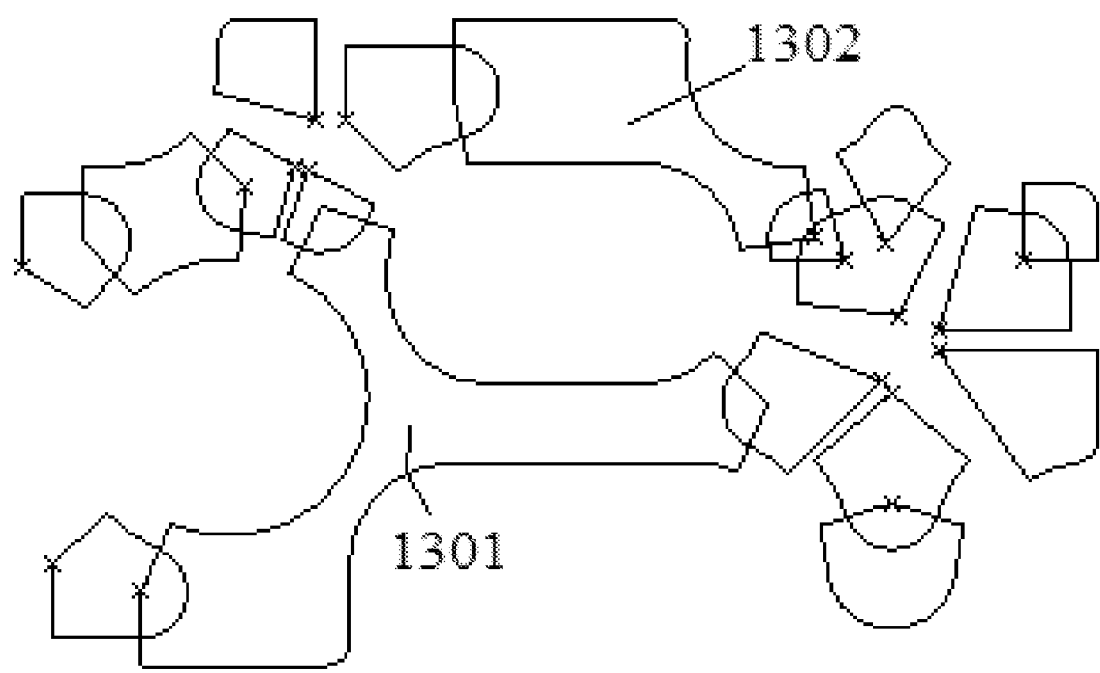
FIG. 13 illustrates valid narrow areas generated by smoothing the original offsets in FIG. 5.

FIG. 13 illustrates valid narrow areas, i.e., trochoidal areas, generated by smoothing the original offsets in FIG. 5. As illustrated in FIGS. 12 and 13, groups 1203,1205,1206 are connected by trochoidal area 1301. Additionally, groups or sub-pockets 1205,1206 are connected by trochoidal area 1302.

Figure 14:
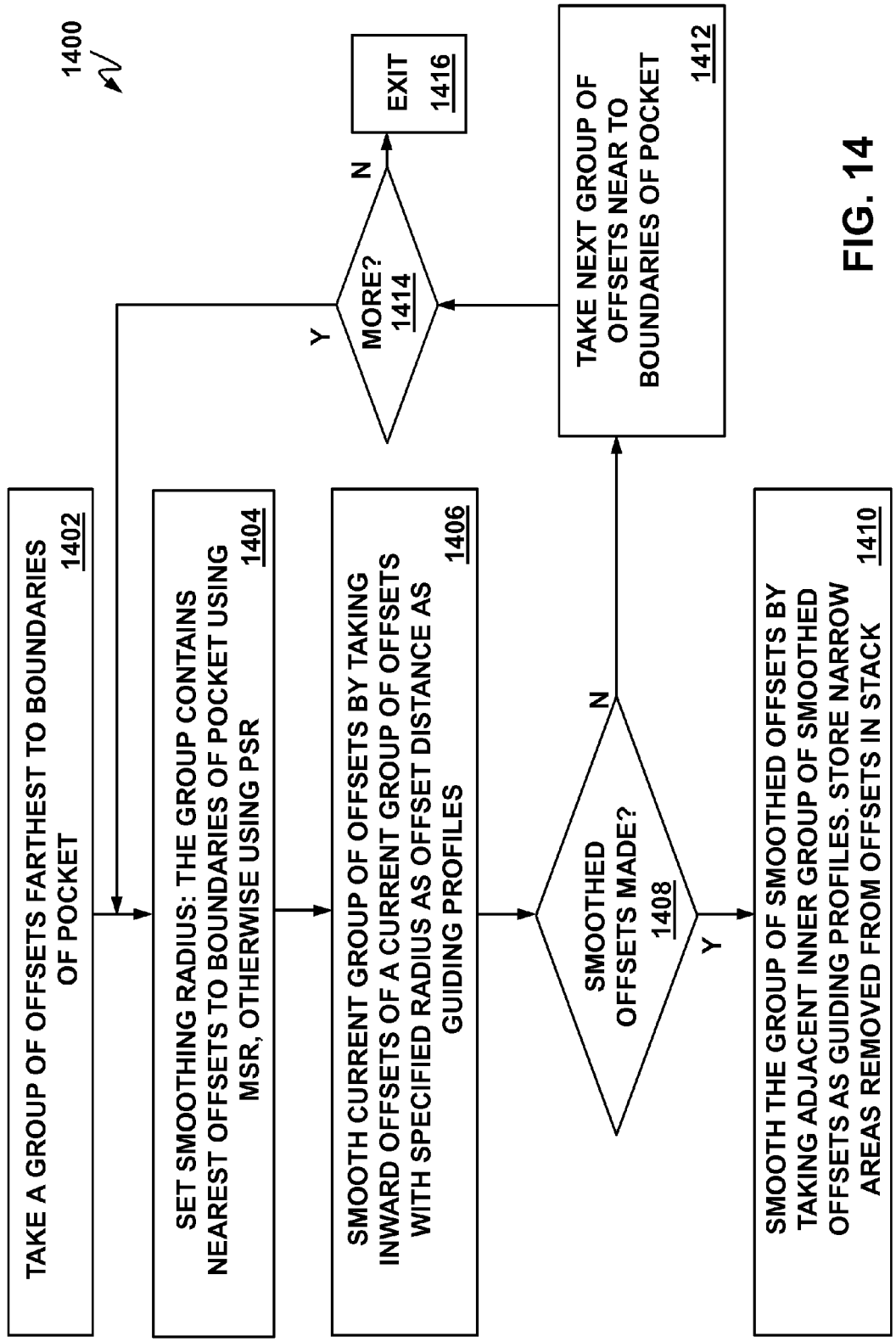
FIG. 14 depicts, in a top-level flowchart, an exemplary smoothing offset procedure.

FIG. 14 illustrates, in a top-level flowchart, an exemplary smoothing offset procedure 1400. In the first part of the procedure, a group of offsets farthest to the boundaries of the pocket is selected (step 1402). Second, the smoothing radius is set, where the group contains the nearest offsets to the boundaries of the pocket using MSR, or otherwise using PSR (step 1404). Third, the current group of offsets is smoothed by taking inward offsets of the current group of offsets with a specified radius as offset distance as guiding profiles (step 1406). Fourth, the procedure checks whether smoothed offsets were made (step 1408). If smoothed offsets were made, the group of smoothed offsets is smoothed by taking an adjacent inner group of smooth offsets as guiding profiles, and the narrow areas are stored and removed from the offsets in stack (step 1410). If no smoothed offsets are made, the next group of offsets near to the boundaries of the pocket are selected (step 1412). Then, the procedure check to see if there are any more offsets (step 1414). If there are no more offsets, then exit (step 1416). If there are more offsets, then begin again at the second step (step 1404).

Third Exemplary Embodiment

This exemplary embodiment describes how to connect the smoothed offsets and trochoidal movements inside their attached trochoidal areas to generate a complete tool path of a pocket. Before connection, the smoothed offsets will be grouped and sorted by using the offset's attributes, such as adjacent relationship of offsets, containing relationship between two adjacent closed offsets, and/or open or closed offsets. The open and closed offsets may be grouped separately. Grouping for each open group that contains only open offsets starts from the un-grouped offset farthest from the pocket boundaries, followed by its adjacent near offset, if it meets: a) minimal distance between them equal to stepover; and b) all adjacent far offsets of this adjacent near offset have been contained by existing groups. The process goes on until an adjacent near offset is unavailable. Sorting open groups may be based on the distance between the first offset in the group to the pocket boundaries. The group with larger distance to pocket boundaries may be put in front of the list and may be connected early. A tree structure is used to manage the connection orders among closed offsets in pocket or sub-pocket. Each node of the tree is a group of closed offsets in which each consecutive two closed offsets are adjacent and an outer closed offset contains only one adjacent inner closed offset. The outermost closed offset in the group is put in the beginning of the group. The root node of the tree contains a group of closed offsets nearest to the pocket boundaries, and higher nodes of the tree contain the groups of far offsets. The first/outmost offset in a tree may or may not be adjacent to an open offset or outmost offset of another sub-pocket. All sub-pockets are stored regarding to the grouping orders. As illustrated in FIG. 12, there are four groups of open offsets 1201,1202,1203,1204, and four groups of closed offsets 1205,1206,1207,1208.

Figure 15A:
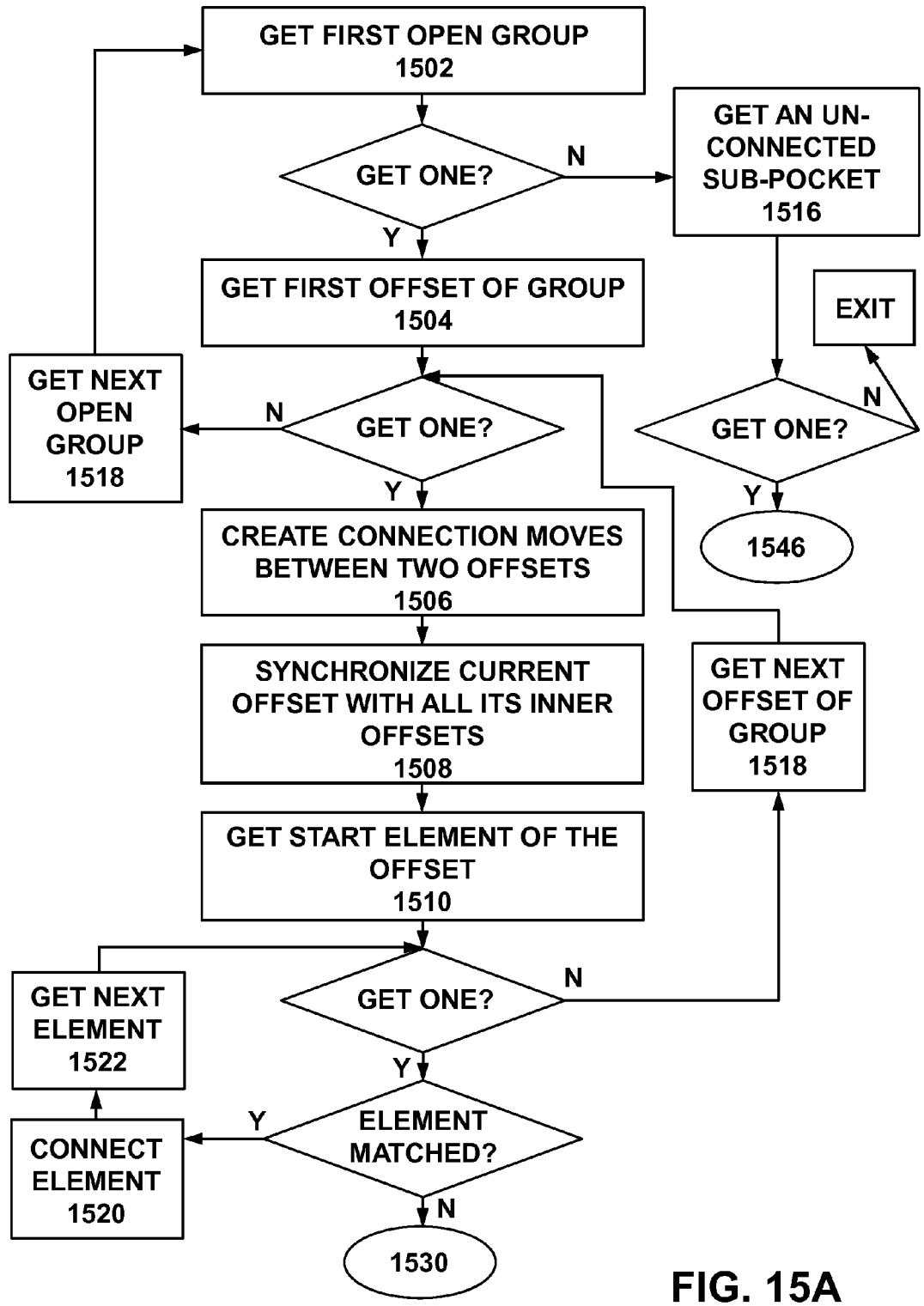
FIGS. 15A-C depict, in a top-level flowchart, an exemplary procedure for connecting the offsets.
Figure 15B:
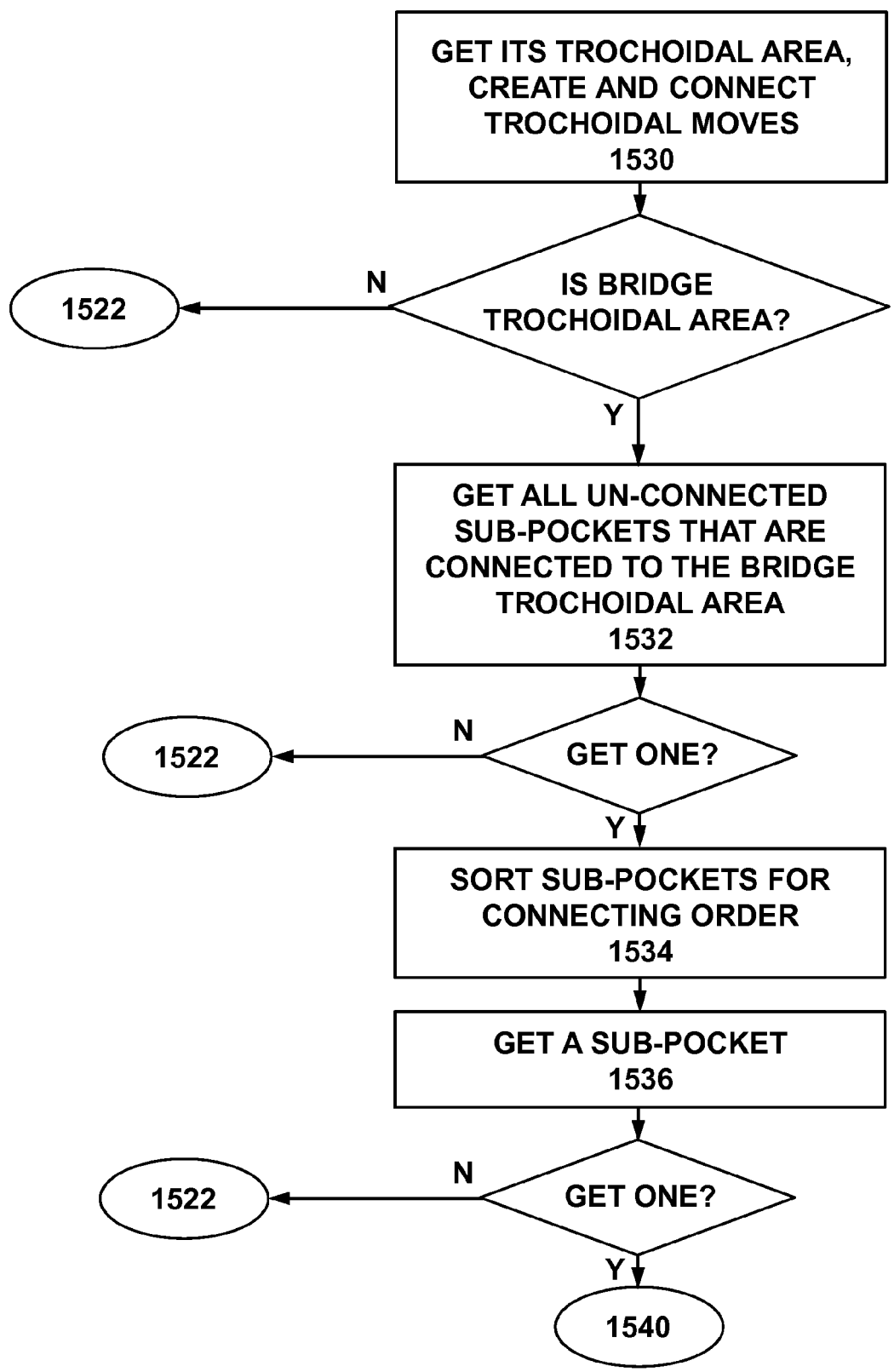
Figure 15C:
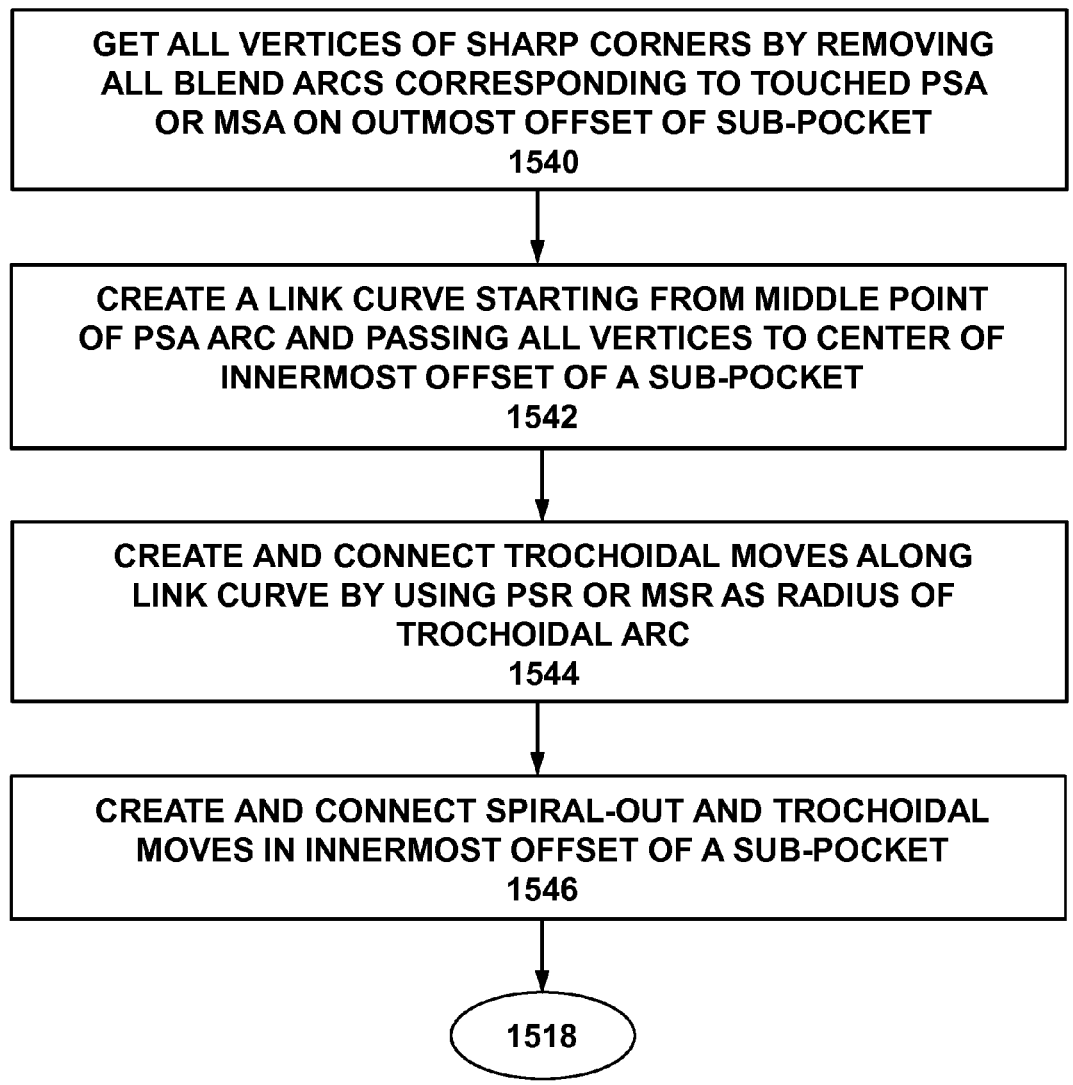

FIGS. 15A-15C depict, in a top-level flowchart, an exemplary procedure for connecting the offsets. Offset connection starts with the first open offset in the first open group if it is available (step 1502). If a first open group is not available, e.g., an entry point is not specified or the entry point is located in an inner sub-pocket, then the procedure may start with an innermost closed offset in either the first inner sub-pocket of the first pocket or sub-pocket (step 1516). If there are no un-connected sub-pockets, then the procedure ends (step 1517). If there is an unconnected sub-pocket, then the procedure creates and connects spiral-out and trochoidal moves in the innermost offset of a subpocket (step 1546). If a first open group is available, then the procedure gets the first offset of the group (step 1504). If there is no first offset of that group, then the procedure gets the next open group (step 1518). If there is a first offset of the group, the procedure creates one or more connection moves between two offsets (step 1506). The offset is to be synchronized with all its adjacent inner offsets by a parallel or concentric relationship for segments or arcs, respectively, before starting to connect (step 1508). The procedure then gets the start element of the offset (step 1510). If there is no start element, then the procedure gets the next offset of the group (step 1519). By synchronization, whether an element on the current offset has a matched element on an adjacent inner offset or not is identified. The areas having unmatched elements are trochoidal areas, which are generated in the second embodiment and may be extracted by corresponding a blend arc on an inner offset. The trochoidal movements inside trochoidal areas are generated to replace all un-matched elements on this offset (step 1530). If elements are matched, the elements are connected (step 1520) and then the procedure gets the next element (step 1522).

If the trochoidal area is not the bridge trochoidal area (See FIG. 17), then the procedure gets the next element (step 1522). If the trochoidal area is the bridge trochoidal area, then the procedure gets all un-connected sub-pockets that are connected to the bridge trochoidal area (step 1532). If there are no un-connected sub-pockets, then the procedure gets the next element (step 1522). If there is an un-connected sub-pocket, then the bridge sorts the sub-pockets for connecting order (step 1534). Then, the procedure gets a sub-pocket (step 1536). If there are no sub-pockets, then the procedure gets the next element (step 1522). If there is a sub-pocket, then the procedure gets all vertices of sharp corners by removing all blend arcs corresponding to touched PSA or MSA on the outmost offset of the sub-pocket (step 1540). All blend arcs in inner offsets of the sub-pocket, which correspond to the PSA or MSA of the bridge area, or the matched outmost offset of the sub-pocket are removed. Therefore, the vertices of sharp corners are recovered. The procedure creates a link curve starting from a middle point of the PSA arc and passing all vertices to the center of the innermost offset of a sub-pocket (step 1542). A link curve is made by starting from the middle point of the PSA or MSA on the outmost offset and passing all these vertices in the order of outer vertex to inner vertex, and then to the center of the innermost offset. The procedure creates and connects trochoidal moves along the link curve by using PSR or MSR as the radius of the trochoidal arc (step 1544). Trochoidal movements along this link curve with PSR or MSR as a radius of the trochoidal arc are generated and connected to bridge trochoidal movements. The procedure creates and connects spiral-out and trochoidal moves in the innermost offset of a sub-pocket (step 1546). The offsets of this sub-pocket are connected in order, from the innermost to the outer offset. The link curve made previously is used to connect the two adjacent offsets, as illustrated in FIG. 18. Then, the procedure proceeds to get the next open group (step 1518).

Figure 16:
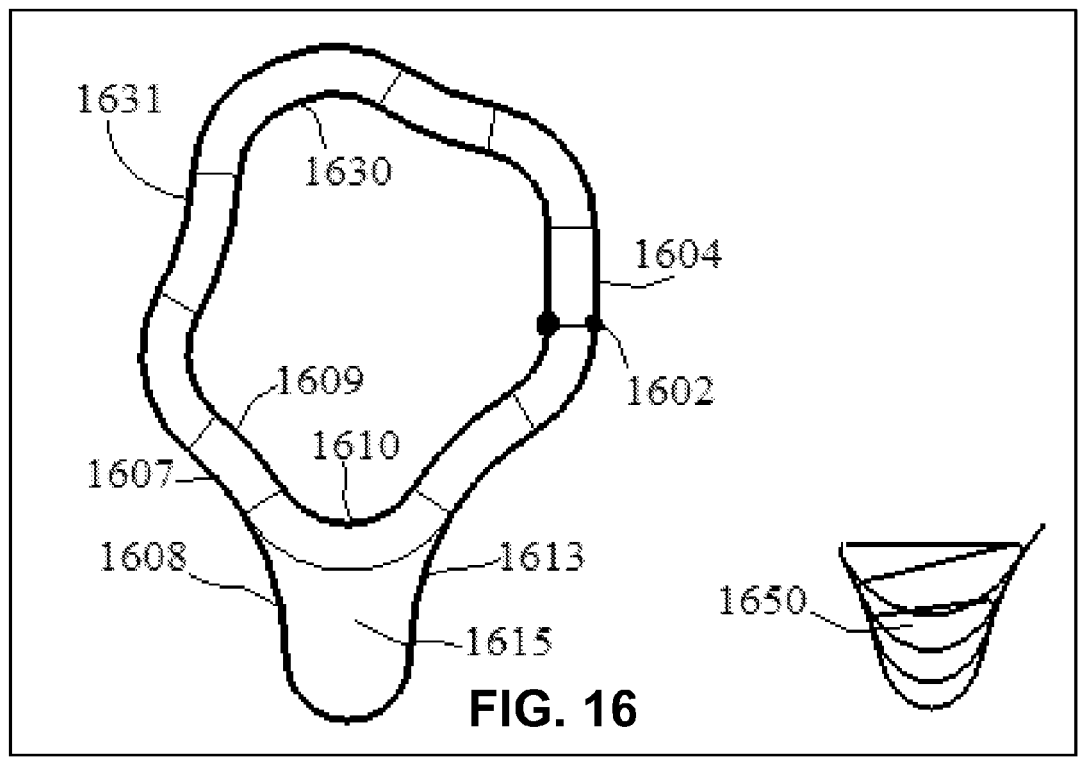
FIG. 16 depicts an exemplary offset connection.

The two synchronized adjacent offsets, connecting elements, and finding the trochoidal area are illustrated in FIG. 16. Assuming the outer smoothed offset 1631 is being connected, point 1602 is the start point on offset 1631, and the tool moves in a counter-clockwise direction, so element 1604 is the first movement to be connected. The elements from 1604 to 1607 on offset 1631 in counter-clock wise direction, which have matched elements on adjacent inner smoothed offset 1630, are directly connected in order. Element 1608 on offset 1631 has no matched element in offset 1630. The corresponding blend arc 1610 may be found from its previous element 1607 on offset 1631 to matched element 1609 on offset 1630, and then to element 1610 on offset 1630. Trochoidal area 1615 is extracted by searching blend arc 1610 in the map of blend arcs and trochoidal areas generated in second embodiment. The trochoidal movements 1650 generated in trochoidal area 1615 will replace the elements from 1608 to 1613 in order and in a counter-clockwise direction.

Some trochoidal areas that are generated by partial offsets and multiple blend arcs are connected with multiple open groups of offsets or sub-pockets. This kind of trochoidal area is called a bridge trochoidal area 1704 and used as a bridge to lead the tool from the outmost offset in a group of offsets to the outmost offset in another group of offsets by trochoidal movements. The tool will usually not move into the open group from the bridge trochoidal area, because it is better to enter an open group of offsets from its open end.

The start position 1700 of trochoidal movements 1702 in a bridge trochoidal area 1704 is determined by which blend arc in the smoothed offset is used to extract the trochoidal area. The trochoidal movements stop when the bottom trochoidal arc touches one of PSA or MSA 1706 on the outmost offset of a sub-pocket, as illustrated in FIG. 17.

When a bridge trochoidal area 1704 is connected to multiple groups of offsets, the order to connect each group of offsets is determined by the length along the border of the bridge trochoidal area 1704, from the start end of the bridge trochoidal area 1704 to the middle point of touched PSA or MSA 1706. The group of offsets with a shorter length to the start end of trochoidal is connected earlier.

Figure 17:
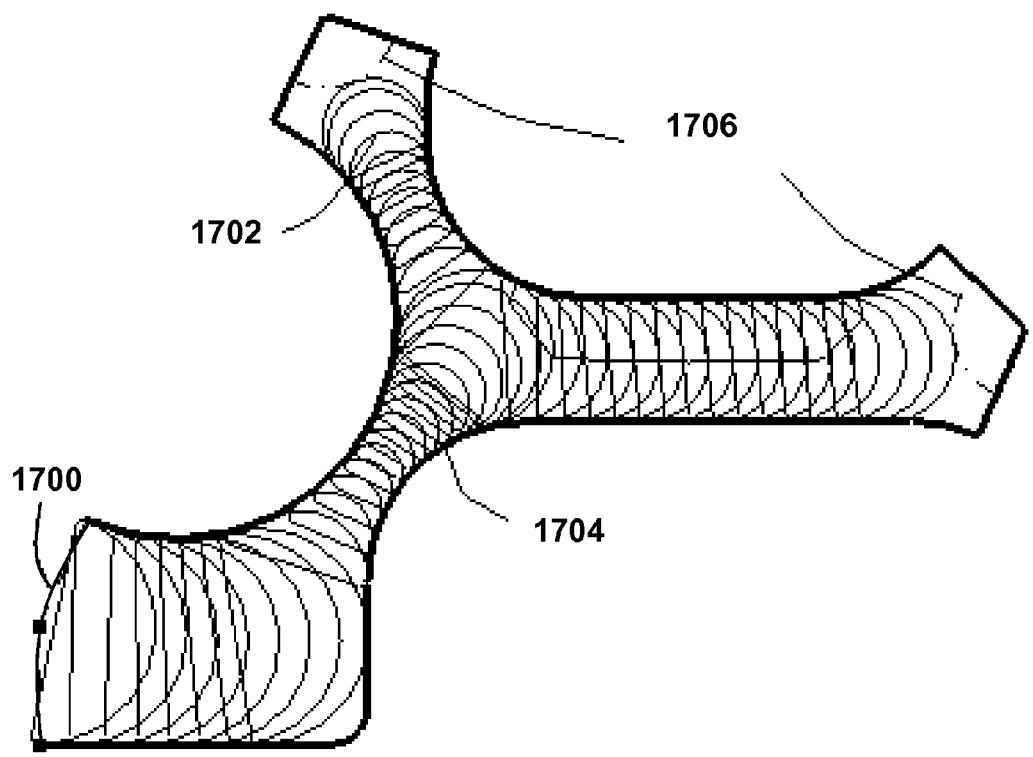
FIG. 17 depicts exemplary trochoidal movements in a bridge trochoidal area.
Figure 18:
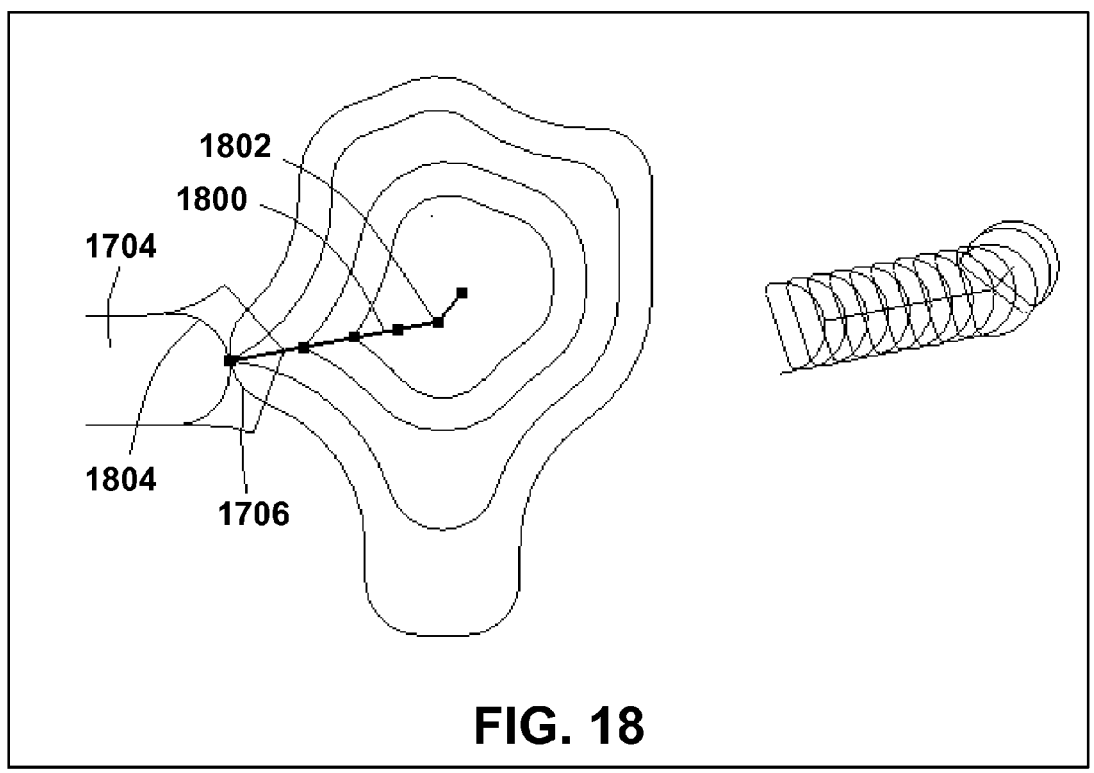
FIG. 18 depicts an exemplary link curve used to connect adjacent offsets.

FIG. 18 depicts an exemplary link curve 1800, or connecting curve, used to connect adjacent offsets (See FIG. 17). The connecting curve 1800 has a corner vertex 1802. The bridge trochoidal area 1704 may be used as a bridge to lead the tool from the outmost offset in a group of offsets to the outmost offset in another group of offsets by trochoidal movements. The trochoidal movements stop when the bottom trochoidal arc 1804 touches one of PSA or MSA 1706 on the outmost offset of a sub-pocket.

Figure 19:
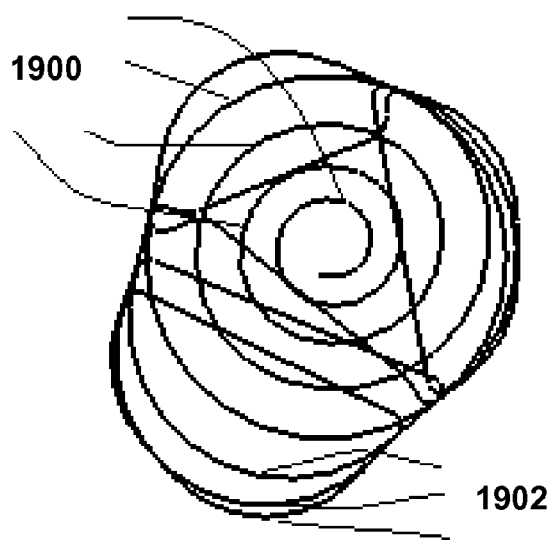
FIG. 19 depicts exemplary spiral-out tool movements and trochoidal movements.

Spiral-out tool movements 1900 will be generated in inner offset of pocket or sub-pocket until reaching offset, followed by trochoidal movements 1902 generated in areas between spiral-out movements and innermost offset (step 1546), as illustrated in FIG. 19.

It is a recursive procedure to connect all offsets and trochoidal movements in attached trochoidal areas. By repeatedly using the different methods described above, all kinds of movements are traversed naturally.

Figure 20:
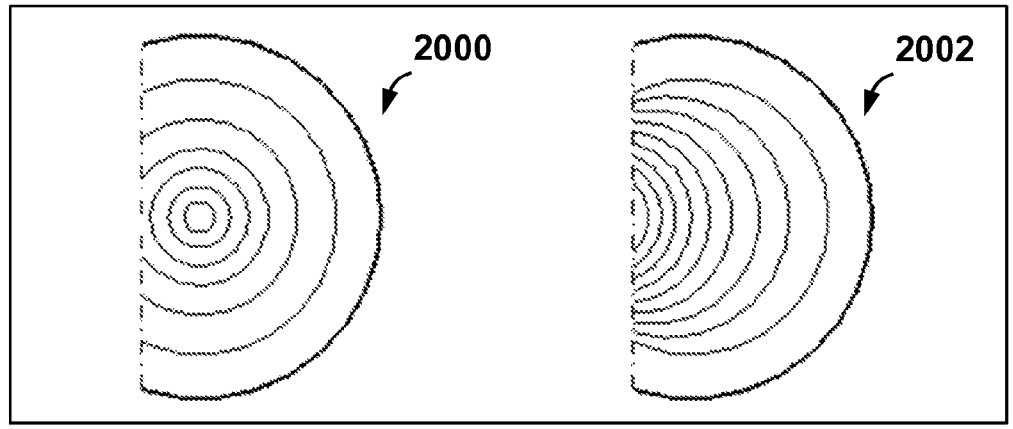
FIG. 20 depicts trochoidal movements.

FIG. 20 depicts the spiraling moves in the major arc of an exemplary embodiment. In one embodiment, more movements may be necessary to remove the material inside first trochoidal arc in the start end of bridge area if the chord of trochoidal arc is an open edge. The conventional concentric spiraling-out movements 2000 are good enough if the first trochoidal arc is a minor arc. Otherwise, the conventional concentric spiraling-out movements 2000, as also depicted in the left picture in FIG. 20, will have problems in leading the tool into inner circular movements from the open side of arch without slotting in the material. The method in this embodiment generates a cluster of non-concentric circular arcs 2002 by decreasing the shirking rate on chord of arc to make each circular arc start from the open chord to avoid tool slotting.

Figure 21:
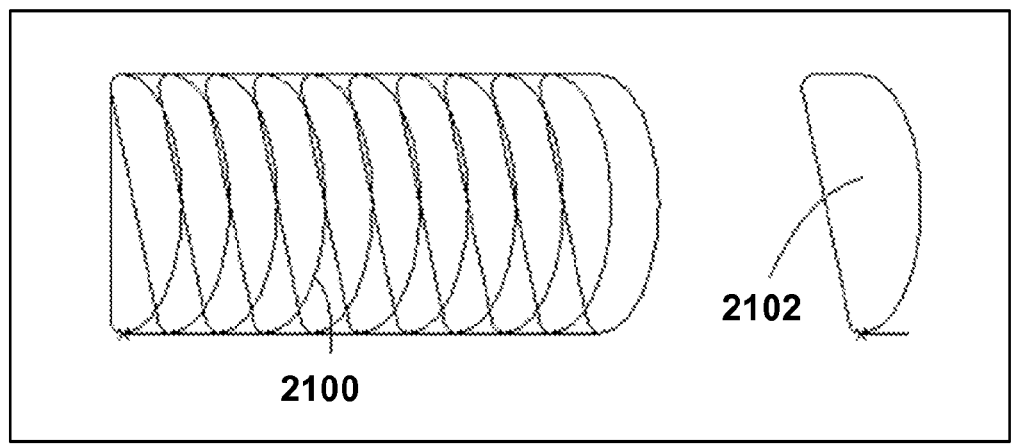
FIG. 21 depicts an elliptical arc based trochoidal movements.

It may be easy to compute circular arc based trochoidal movements. However, it always requires more "loops" to remove the same amount of material under the same maximal tool engagement by comparing with elliptical arc based trochoidal movements because the same width of elliptical arc has a smaller curvature than the circular arc at the point where maximal TEA occurs. The small curvature allows bigger stepover for same TEA, as illustrated in FIG. 21. The elliptical arc 2100 based trochoidal movements are used in some situations to shorten the tool path. The elliptical arc is replaced by three circular arcs where the machine tool does not take the elliptical arc. The elliptical arc 2100 comprises one or more loop movements 2102.

Figure 22:
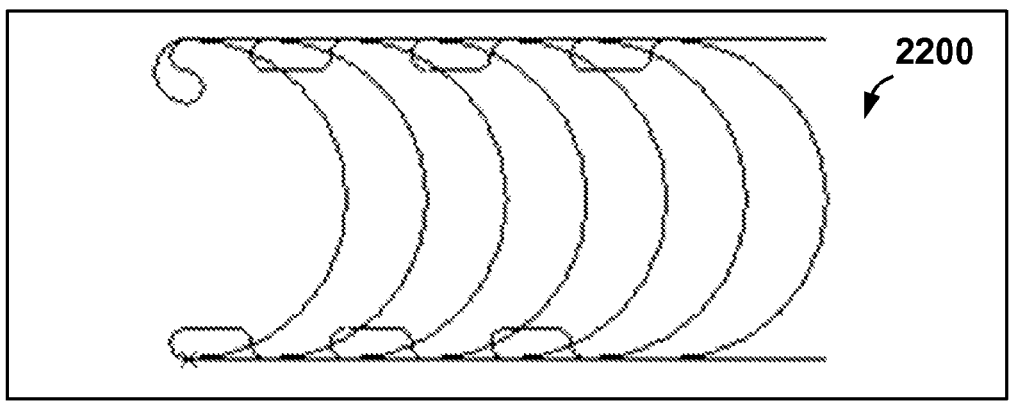
FIG. 22 depicts zig-zag style trochoidal movements.

In one embodiment, trochoidal movements may be a set of loops. The tool enters, cuts, and leaves material followed by pullback moves that do not cut any material in each loop. These pullback moves waste considerable time. FIG. 22 depicts alternate trochoidal moves 2200 and illustrates a scenario where the cutting condition is allowed and the zig-zag style trochoidal movements are supported.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A device comprising:
 a processing module having addressable memory, the processing module configured to:
  select a pocket feature of a workpiece to be machined;
  create at least one contour-parallel offset, wherein the at least one contour-parallel offset is created from at least one boundary of the pocket feature;
  compute a preferred smoothing radius (PSR), wherein the PSR is the radius of a Preferred Smooth Arc (PSA);
  determine one or more groups of offsets;
  smooth a set of the one or more groups of offsets, wherein each offset has the same offset distance to the at least one boundary of the pocket feature;
  generate a set of blend arcs based on all the groups of offsets, wherein inward offsets of all offsets in the group are generated by using the PSR as the computed offset distance;
  smooth the set of the one or more groups of offsets previously smoothed based on an adjacent inner group of offsets;
  determine if any of the offsets can be smoothed, wherein the processing module ends a process if no offsets can be smoothed and the process continues if at least one offset can be smoothed; and
  connect each offset with at least one linking movement;
  wherein the processing module generates cutting movements based on the smoothed set of one or more groups of offsets to save machining time.

2. The device of claim 1 wherein the processing module is further configured to:
 receive an input, by a user, of at least one technological option.

3. The device of claim 1 wherein the processing module is further configured to:
 store any identified narrow areas in a map of blend arcs and narrow areas.

4. The device of claim 3 wherein the processing module is further configured to:
 create a trochoidal movement, wherein the created trochoidal movement is in the stored identified narrow areas.

5. The device of claim 4 wherein the connected each offset starts with an entry movement and connects each adjacent offset until all offsets are traversed.

6. The device of claim 4 wherein the processing module is further configured to:
 generate a numerical code.

7. The device of claim 4 wherein the processing module is further configured to:
 generate auxiliary movements.

8. The device of claim 7 wherein the generated auxiliary movements are at least one of: entry movements and exit movements.

9. A device comprising:

a processing module having addressable memory, the processing module configured to:

select a pocket feature of a workpiece to be machined;

select a group of offsets farthest to the boundaries of the pocket;

determine a smoothing radius, wherein the group comprises the nearest offsets to the boundaries of the pocket using at least one of: Minimal Smoothing Radius (MSR) and Preferred Smoothing Radius (PSR);

smooth the selected group of offsets by taking inward offsets of the current selected group of offsets with a specified radius as offset distance as guiding profiles;

determine whether smoothed offsets were made, wherein if smoothed offsets were made continue to smooth the selected group of smoothed offsets by taking an adjacent inner group of smooth offsets as guiding profiles; and if no smoothed offsets were made, select the next group of offsets near to the boundaries of the pocket;

determine whether there are any more offsets, wherein if there are more offsets, then begin again at the step of determine a smoothing radius; and if there are no more offsets, then exit;

wherein the processing module generates cutting movements based on the smoothed selected group of offsets to save machining time.

10. The device of claim 9 wherein the device is configured to perform a two phase smoothing process wherein each smoothing phase is applied for each group of offsets.

* * * * *